No. 735,663. PATENTED AUG. 4, 1903.
J. F. GENT.
BOLTING REEL.
APPLICATION FILED NOV. 5, 1902.
NO MODEL. 2 SHEETS—SHEET 2.
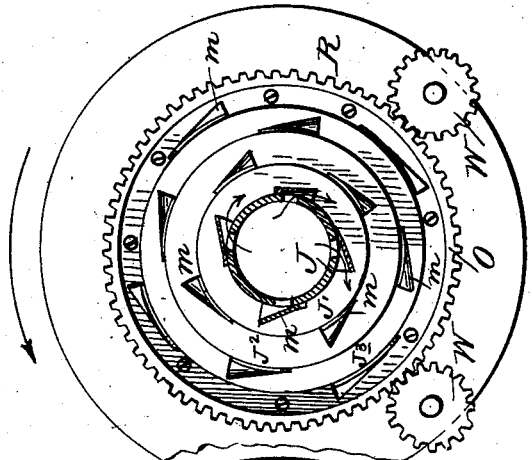
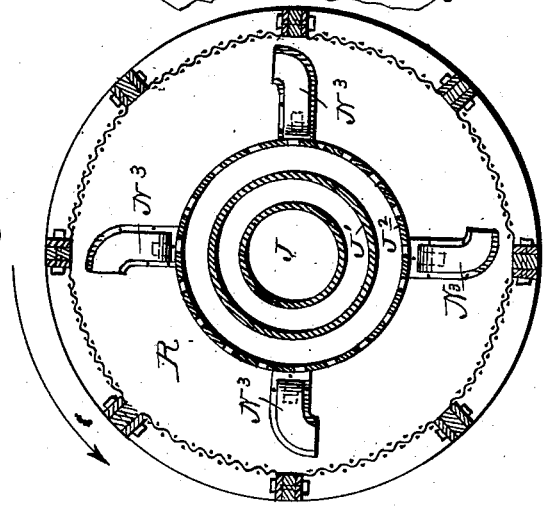
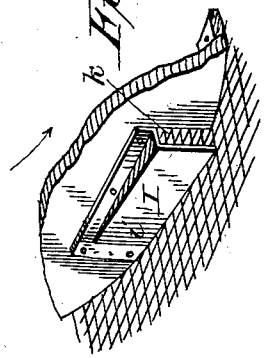
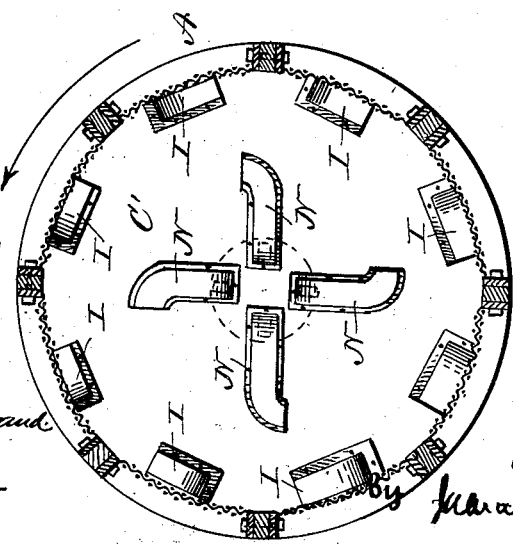
Witnesses
Inventor
Attorney No. 735,663. Patented August 4, 1903.

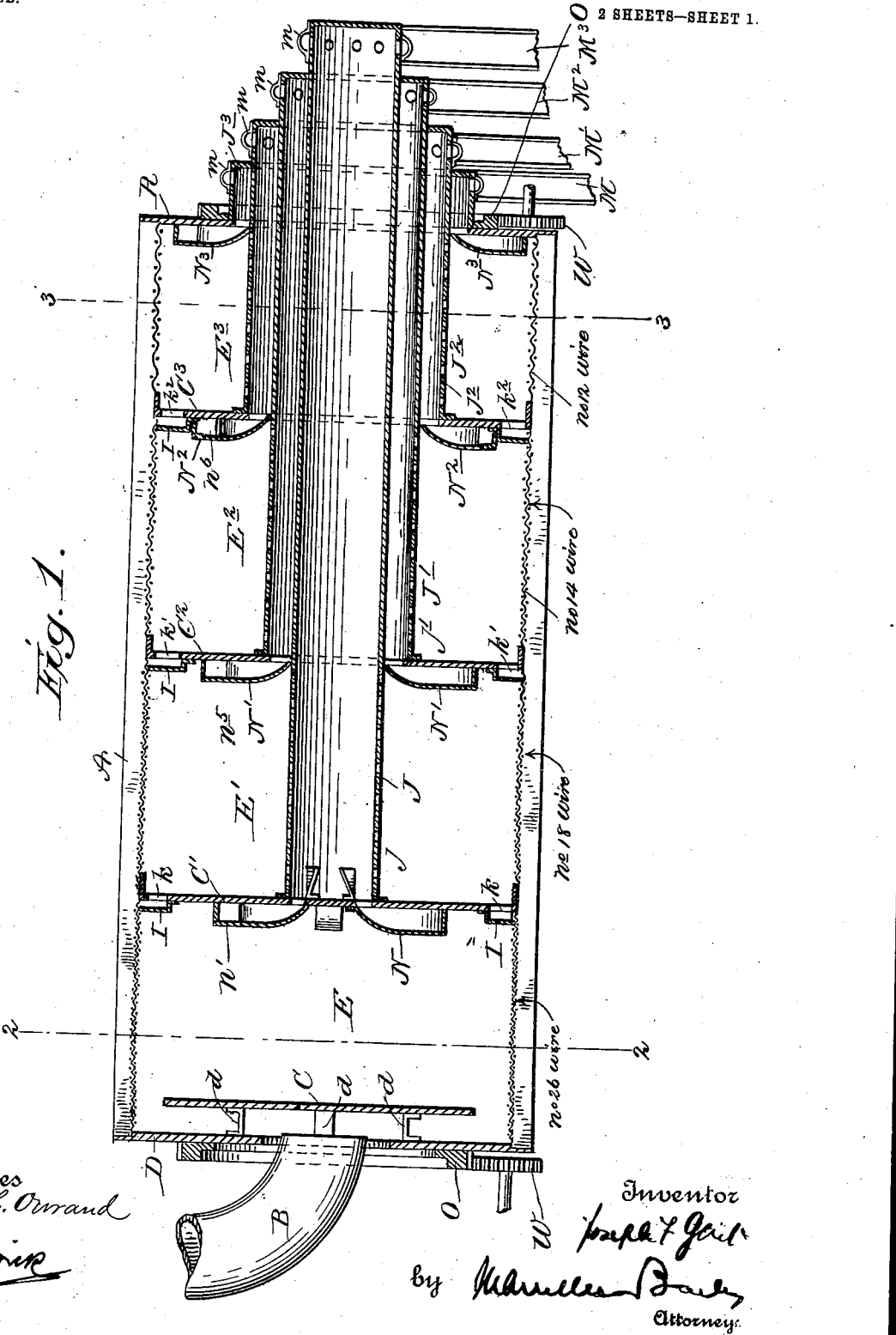

UNITED STATES PATENT OFFICE.

JOSEPH F. GENT, OF MOUNT CLEMENS, MICHIGAN, ASSIGNOR OF TWO-THIRDS TO THOMAS T. GAFF, OF BARNSTABLE, MASSACHUSETTS.

BOLTING-REEL.

SPECIFICATION forming part of Letters Patent No. 735,663, dated August 4, 1903.

Application filed November 5, 1902. Serial No. 130,122. (No model.)

*To all whom it may concern:*

Be it known that I, JOSEPH F. GENT, of Mount Clemens, in the county of Macomb and State of Michigan, have invented a new and useful Improvement in Bolting-Reels, of which the following is a specification.

My invention, which relates to what are known indifferently as "scalping," "separating," or "bolting reels," has to do with the reel proper and is based upon the following observed fact: If a sieve or tray be filled with any ground or broken substance—such as wheat, maize, oats, or any like substance of unequal granular composition or of varying specific gravity—and the sieve or tray be shaken or caused to vibrate in such manner as to allow the material to rest continuously on the cloth or bottom of the sieve or tray, then if the receptacle be brought to rest and its contents examined the coarsest and lightest material will be found at the top of the mass, the next coarser immediately beneath, and so on down through the entire mass in well-defined layers, the finest and purest being at the bottom. An instance of this may be observed in the performance of an ordinary bolting-reel clothed with fine cloth. At the head, where the material enters and the reel is heavily loaded, much clearer and purer material will be found coming through the cloth than farther on in the reel, where the load is comparatively light. This is due to the fact that the purer finer material sinks to the bottom and holds the impurities up away from the cloth. It will also be observed that near the tail or discharge end of the reel the material coming through the same number of mesh contains much impure light fluffy matter, and an examination of the stock coming over from the tail of the reel will show a large percentage of material which ought to have gone through the bolting-cloth, but which had not done so owing to the fact that by reason of the decrease in the load the good material and the impure residue had become so intimately mixed that both were carried out and over the tail of the reel together. It is also a fact that any given scalping or separating reel of existing types clothed with, say, four different meshes or numbers of cloth, the finest at the head, will make but five separations—one separation for each number or mesh of cloth—and the remainder a conglomerate mass of tailings, to separate and grade which one or more additional reels are required, and even then the result is not satisfactory. To remedy these unsatisfactory conditions, I have devised a reel in which there is practically double the number of separations that can be obtained in the ordinary reel having the same number of different meshes of cloth and in which provision is made for the separation and removal of the lighter impure material from the load during the progress of the latter through the reel. This I believe to be new with me beyond its structural embodiment herein.

As my improvement is in the reel proper, I have omitted from the drawings the devices for supporting and driving the reel and the frame in which said devices are mounted. These may be of the same character as now employed in the bolting-reels.

In the drawings, Figure 1 is a longitudinal vertical axial section of the reel. Fig. 2 is a section on line 2 2, Fig. 1. Fig. 3 is a section on line 3 3, Fig. 1. Fig. 4 is an elevation of the tail or discharge end of the reel with the spouts removed. Fig. 5 is an enlarged perspective view of one of the feed-openings and hood therefor (adjoining the periphery of the reel) between one of the reel sections or compartments and the next.

The reel A is provided with heads D and R at its ends and is driven by means of toothed wheels or rims O, secured to the exterior of their heads at each end and meshing with pinions W, which are mounted in the usual way in the supporting-frame of the reel and are power-driven. I prefer also to support the reel on these pinions, because in that event the latter when revolving will impart to the reel a slight jarring motion, which assists the bolting action. A central support of similar nature can also be provided in case the reel is long enough to require it. All these devices, however, are well known and in common use in the usual bolting or scalping reels and require, therefore, no description here.

B is a stationary inlet or feed conduit or pipe which discharges into the reel through a central opening in the front reel-head D, and C is a plate within the reel, in the nature of a spreader or shield, which is arranged opposite to the discharge end of the feed-pipe B and is attached by brackets $d$ to the inner face of head D, with which (and the body of the reel to which the head D is attached) it revolves.

Between the front and rear heads of the reel and at discretionary intervals apart are secured transverse partitions—in this instance three in number, lettered $C'$ $C^2$ $C^3$, respectively—which divide the reel transversely of its length into separate compartments. The compartments in this instance are four in number and are designated E $E'$ $E^2$ $E^3$, respectively. These compartments are peripherally clothed with bolting-cloth of such kind as may be called for by the nature of the material and the character of the separation or separations desired. In the present instance we will suppose that corn products are to be bolted and separated and that compartment E is clothed with No. 26 mesh wire-cloth, $E'$ with No. 18 mesh, $E^2$ with No. 14 mesh, and $E^3$ with No. 12 mesh.

In the partitions $C'$ $C^2$ $C^3$ are formed peripheral openings $k$ of such size and in such number as preferred, through which the finer and purer material that lies next to the bolting-cloth in one compartment is caused to pass from that compartment into the next adjoining compartment toward the tail of the reel. To effectuate this purpose, the said openings are covered by hoods I, somewhat in the nature of scoops. (Seen in Figs. 1 and 2 and shown also on enlarged scale in Fig. 5.) The hood is on that side of the partition from which the material is to pass to the other side thereof. That end of it which is in front (relatively to the direction of the revolution of the reel, as indicated by the arrow in Fig. 5) is open, its other end is closed, and its side is inclined from front to rear, as shown clearly at $i$, Fig. 5, so that the material contained in the compartment in which the hood is located when taken into the mouth of the hood will as the reel continues to rotate be directed by the inclined wall $i$ of the hood into the compartment next beyond. In this way I provide for the transfer from one compartment into the compartment next beyond of such of the finer and purer material as lies at the bottom of the reel in the former compartment, but has not passed through the bolting-cloth of that compartment.

My invention, as hereinbefore indicated, also contemplates the gradual separation and carrying off of the coarser, lighter, and impure substances during the passage of the load through the reel. To this end from each compartment of the reel leads a separate discharge conduit or tube to and out from the tail of the reel. These discharge conduits or tubes are preferably arranged, as seen in Fig. 1, extending lengthwise of and in axial alinement with the reel and nested together, as shown. Tube J pertains to compartment E, tube $J'$ to compartment $E'$, tube $J^2$ to compartment $E^2$, and tube $J^3$ to compartment $E^3$ next the tail of the reel. These tubes, which revolve with the reel, are arranged concentrically with the reel and with one another and in such manner that there shall be between each inner tube and the one which is next outside of it an annular space sufficient to allow of the uninterrupted passage through the outer tube of such products as may be delivered into it. Tube $J^3$ is the shortest and has the greatest diameter of all the tubes. It is secured to and projects rearwardly from the exterior of the rear reel-head R, (which forms the rear wall of the compartment $E^3$,) its rear end is closed, and it communicates with the compartment $E^3$ through an opening of equal diameter formed in the head R. The tube $J^2$ of next smaller diameter leads from the partition $C^3$ through compartment $E^3$ and tube $J^2$, beyond which its closed rear end projects. Likewise the tube $J'$ of next smaller diameter leads from partition $C^2$ through compartment $E^2$ and thence through and rearwardly beyond tube $J^2$, and the tube J of smallest diameter of all leads from partition $C'$ through compartment $E'$ and thence through and rearwardly beyond tube $J'$.

Within compartment E and secured to partition $C'$ are a series of radial buckets or scoop-shaped conduits N, whose inner ends communicate with tube J and whose mouths extend outwardly toward the cloth in such position and location as to take up the coarser and lighter material which lies at the top of the mass in compartment E, this material as the scoop or buckets revolve with the reel being discharged from the inner ends of the scoops into the revolving tube J, through which tube, as it gradually accumulates therein, the said material is moved along toward the rear or discharge end of the tube. Similarly and for a like purpose within each of the succeeding compartments $E'$, $E^2$, and $E^3$ is a corresponding series of buckets or scoops, (lettered $N'$ $N^2$ $N^3$, respectively,) $N'$ discharging into tube $J'$, $N^2$ into $J^2$, and $N^3$ into $J^3$. The mouths of the scoops or buckets $N'$ extend outwardly nearer to the cloth or periphery of the reel than those of the buckets N, and the same is true of the other series $N^2$ and $N^3$—each extends outwardly nearer to the cloth than the series of buckets in the next preceding compartment. This is due to the fact that in each compartment the bulk of the material under treatment is less than in the compartment preceding, and consequently the buckets must be correspondingly elongated, so as to reach and take up the coarser, lighter, and impure matters which form the upper part of the mass.

It will be noted that that portion of each discharge-tube J $J'$, &c., which passes through the reel-compartment immediately succeeding the one with which it communicates and from which it receives its supply of the lighter and impure material is not surrounded by any exterior tube, and this section or portion of each one of the tubes I make from finely-perforated metal, as indicated at $j\ j'\ j^2$. These perforations in location and size in all cases correspond to the mesh of the covering-cloth of the last or tail compartment of the reel, which in this instance is No. 12 mesh.

The buckets N, &c., unavoidably take up with the impure material a certain percentage of the pure material which should be bolted, and this pure material should be separated from the impure and returned to the reel. It is for this purpose that the perforated sections $j$, &c., are provided. As the material taken up and delivered to any one of the central tubes—say tube J—reaches the perforated section of that tube any portion of said material which will pass through a No. 12 mesh will pass through the perforations in said section and will consequently be returned to the reel-compartment through which the perforated compartment extends, while the remainder of the material passes beyond the perforated section and travels along through the now imperforate tube toward the tail of the latter, where it is discharged. It will be noted that under this arrangement I make practically on a reel having four compartments two separations in each compartment—one through the cloth for fine material and one through the central discharge-tube for coarse material—or eight separations in all.

The tubes N, &c., at their tail ends project one beyond the other a sufficient distance to allow each to discharge separately into one of the stationary hopper-spouts M M' M² M³, Fig. 1, each tube, as seen in Figs. 1 and 4, having peripheral discharge-openings, to which are secured external deflecting buckets $m$, so applied that as the tube revolves the material is dropped gently and without scattering from the buckets into the hoppered spouts below. There are of course separate hoppered spouts also for each compartment of the reel; but these I have omitted from the drawings, as unnecessary to an understanding of my improvement.

The operation is as follows: The reel A being in revolution, the ground material to be separated enters the first compartment E of the reel through the feed-pipe B and striking against deflecting-plate D is evenly discharged against the cloth covering and immediately begins sliding upon the cloth, the finer and purer portions settling to the bottom, the coarser and lighter portions rising to the top and gradually filling up to the level of the buckets N, which thereupon pick up the lightest and coarsest material and discharge it into tube J. This tube having the same motion as the reel works the material thus received by it backward and out through the tail of the reel, discharging it into spout M, while any finer material which may have been picked up by the buckets N will fall through the perforated section $j$ into compartment E'. At the same time such of the finer material as has not passed through the fine cloth on compartment E is being gradually caught by the hoods I on partition C' and discharged into section E'. When section E' becomes full enough for its scoops or buckets N' to catch the coarse and light material, they in turn are brought into action and take up this material and discharge it into tube N', and so on for the remaining two compartments. We now have a reel each compartment of which is loaded with a load which is constant and unvarying and will remain so while the machine is in action, thus insuring uniform and even bolting.

In small mills the material discharged through the tailing-spouts M, &c., may be separately aspirated, reground, and returned to the same reel, so that all the bolting can be done on one reel.

It is to be observed that when the compartments of the reel are properly filled the hoods I are too far below the top of the load to catch the light material, and consequently each succeeding section is being filled with purer material, whereas in reels such as now in general use the stock becomes poorer as the work advances.

Having described my improvement and the best way now known to me of carrying the same into effect, I desire to be understood that I do not limit myself to the structural details herein set forth in illustration of said improvement, for manifestly the same can be considerably varied without material departure from the principle of the invention; but

What I claim, and desire to secure by Letters Patent, is—

1. A bolting-reel divided transversely into a plurality of compartments, communicating with one another through openings at or near the periphery of the reel, in combination with an interior discharge tube or conduit from each compartment leading to the tail of the reel, and means for picking up the lighter and coarser material in each compartment and delivering it to the discharge tube or conduit leading therefrom, substantially as and for the purposes hereinbefore set forth.

2. A bolting-reel divided transversely into a plurality of compartments communicating with one another through openings at or near the periphery of the reel, in combination with an interior discharge tube or conduit from each compartment leading to the tail of the reel and having a perforated section, and means for picking up the lighter and coarser material in each compartment and delivering it to the discharge-tube leading therefrom, substantially as set forth.

3. In a bolting-reel divided transversely into a plurality of compartments, an interior discharge tube or conduit leading from each compartment to the tail of the reel through the intervening compartment or compartments and the discharge tube or tubes pertaining to the same, and means for picking up and delivering the lighter and coarser material in the several compartments to their respective discharge-tubes, substantially as set forth.

In testimony whereof I have hereunto set my hand this 1st day of November, 1902.

JOSEPH F. GENT.

Witnesses:
 LOUIS MATT,
 ANA MATT.